F. URBINA.
PIPE LINE.
APPLICATION FILED APR. 19, 1919.

1,344,321.

Patented June 22, 1920.

Inventor:-
Fernando Urbina
By:- B. Singer,
Atty.

UNITED STATES PATENT OFFICE.

FERNANDO URBINA, OF MEXICO, MEXICO.

PIPE-LINE.

1,344,321.  Specification of Letters Patent.  Patented June 22, 1920.

Application filed April 19, 1919. Serial No. 291,406.

*To all whom it may concern:*

Be it known that I, FERNANDO URBINA, a citizen of the Republic of Mexico, and a resident of Mexico city, Mexico, have invented a certain new and useful Improvement in Pipe-Lines, of which the following is a specification.

This invention relates to pipe lines for the conduction of liquids and gases, and especially of crude oil, and consists in the use of compressed paste board made impermeable and incombustible and reinforced conveniently, for the construction of the pipe sections.

It is an object of this invention to provide a pipe line which at a much lesser weight and cost presents the same resistance to inner pressure as the pipe lines made of iron or steel, and which at the same time is free from expansion and contraction due to changes of the temperature. It is another object of this invention to provide a pipe line of a material with a low conductibility of heat, as this is an important factor in the conduction of crude oil where this has to be preheated before being pumped through the line for reducing its viscosity, the loss of heat through radiation in metal pipes resulting in the necessity of a greater number of intermediate pumping and heating stations. It is furthermore an object of this invention to permit the construction of longer pipe sections, the number of joints being thereby diminished, and of pipes of a greater diameter, as the use of larger pipes, besides obviously permitting the passage of a proportionally larger body of liquid, prevents, especially in the conduction of crude oil, the viscosity and adherence of the oil to the walls of the pipes from choking the line, thus reducing the number of force pumps in a given extension of the line, and also the pressure initially necessary for the delivery of the oil. It is finally an object of my invention to provide a pipe joint which, while presenting the same strength as the screw joints used on iron or steel pipes, may be easily put on without the use of special tools, this joint being furthermore adaptable to be used instantly for reinforcing any section of the line where a leak has developed, without disturbing adjoining sections of pipe.

The features of my invention are fully described in connection with the accompanying drawings, and are specifically set forth in the claims.

Figure 1:
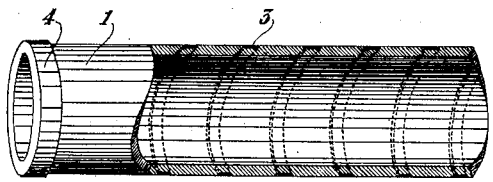
Figure 1 represents one extremity of a pipe section, a partial longitudinal section being also shown.

The material used in the construction of the pipe sections is formed of paste board made of a number of layers of ordinary strong paper or thin paste board, or of paper or paste board made of special fibrous material such as cocoa fiber or refuses of various textile fibers which will form a very strong and tough material for the pipe sections. In the practice each pipe section 1 is constructed by winding or wrapping layers of said material spirally about a mandrel or core of a suitable size, the different spiral layers preferably crossing each other so as to form a homogeneous body without any weak points.

I impregnate the material of which the paste board is composed, with chlorid of zinc or some other chemical solution for making the pipe impermeable to air and moisture, and after winding the pipe section, its walls are exposed to a great pressure for reducing their thickness, a material substantially equal to vulcanized fiber board being formed. It is obvious that the thickness of the walls depends from the diameter of the pipe and especially from the pressure at which the liquid is forced through the line. With some classes of crude oil, this pressure is considerable owing to the viscosity of the oil and to the increase of its consistency through loss of heat by radiation in the line, and therefore the use of larger pipes is indicated as they permit the passage, in a given time of the same quantity of oil at a far lesser pressure while the oil retains its temperature for a longer time because of its greater body and, in the case of pipe lines constructed according to this invention, by being conducted through a material which is not heat absorbing. The net potential of consumption in the transportation of crude oil through pipe lines is proportional to the product of delivery through initial pressure. The cost of transportation for each barrel depends therefore only from the initial pressure and consequently this has to be reduced to the least amount; as the oil can not be heated above a certain limit, the degree of viscosity can not be altered, and the only recourse left consists in the increase of the diameter of the pipe. By solely duplicating the diameter, the pressure necessary is reduced to the fourth part, and in the same proportion the cost of transportation for each barrel is reduced. Metal pipes of a diameter larger than 10" or 12" can hardly be used for pipe lines of this sort for reasons of weight, high cost and difficulties in transportation, while pipes of a diameter three times greater may easily be constructed according to this invention.

In order to increase the lateral resistance of the pipe sections, I provide a reinforcing winding of wire (2) or of narrow metal strips (3) wrapped preferably in spiral relation around one of the last or exterior layers of the material which makes up the paste board, said reinforcing wrappings being covered by more layers of material for excluding the air and moisture. These outer layers are furthermore preferably mixed with clay, cement or graphite which substances make the surface of the pipe incombustible.

Figure 2:
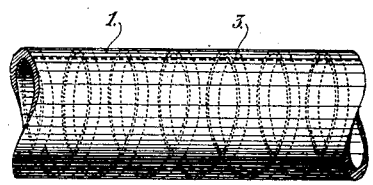
Fig. 2 shows a portion of a pipe with the reinforcing metal strips wrapped in spiral relation.
Figure 3:
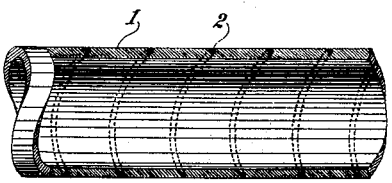
Fig. 3 shows a partial section of a pipe with reinforcing spirals of wire.
Figure 4:
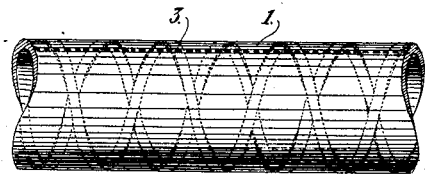
Figs. 4 and 5 show modifications in the winding of the reinforcing strips.
Figure 5:
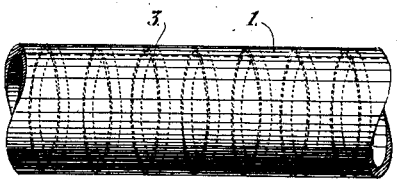

In the accompanying drawings, different styles of reinforcement are shown, consisting in strips forming simple spirals (Fig. 2), double opposed spirals (Fig. 4) and circular hoops (Fig. 5).

After being thus reinforced and the final exterior layers applied and the walls of the pipe compressed as described before, the pipe section is impregnated in a suitable tank with slightly burned asphaltum which protects the inner surface of the pipe against chemical decompositions by the oil and the outer surface against moisture, and hollow metal rings (4) are forced over the extremities of each section for giving them greater resistance. The ends of the reinforcing strips or wires are also held in place by these rings, to the outer flange of which they may be riveted or fastened by any other suitable means.

Figure 6:
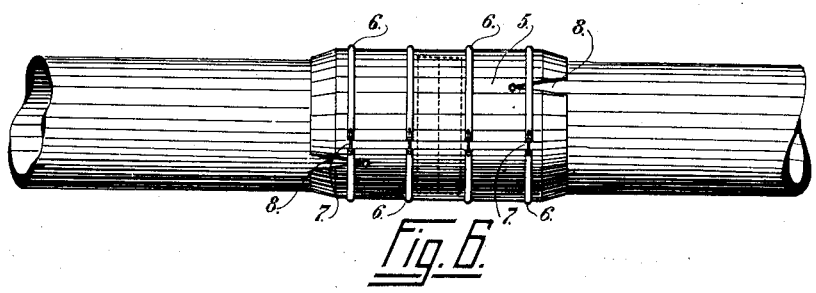
Fig. 6 represents a joint uniting two pipe sections.

For uniting the different sections of pipe in forming a pipe line, I provide a joint 5 which consists substantially of a shorter length of pipe with an inner diameter equal to the outer diameter of the pipe sections. Said joints may be made preferably of the same material as the pipe sections, that is, of paste board compressed and made impermeable and incombustible as already described, and with or without any reinforcing wrappings. Instead of using joints of the aforesaid material I also employ metal joints made of sheet steel and having substantially the same form. These joints at their extremities are provided with a number of longitudinal conical openings 8 cut out as shown in Fig. 6, which permit the metal hoops 6 encircling the joints to compress said ends firmly producing an intimate contact of the joint with the body of the pipe, the pressure of said hoops being regulated by means of the screws 7. In the practice it will be advisable to provide a number of hoops to encircle the joint at different places so as to increase its strength and resistance.

It will readily be seen that for stopping a leakage in any part of the line, such joints of a slightly larger diameter may be used, as it will only be necessary after cutting the joint open lengthwise, to apply the same over the weak point after which the hoops are fastened as described, without having to take out the whole section of line, the natural elasticity of the paste board making a tighter contact between the pipes and the joint the greater the pressure is in the line.

I do not limit myself to any particular condition or preparation of the paste board, or to any particular substance for making the same impermeable and incombustible, or to any special form of winding the reinforcing strips or wires. Variations may be made in all these features, as also in the form and construction of the joint within the limits of this application.

What I claim is:

1. A pipe comprising superposed layers of paste board, a spirally wound metallic reinforcing element embodied in the pipe layers, and rings on the ends of the pipe and to which the ends of said reinforcing element are secured.

2. A pipe line composed of pipe sections of compressed paste board, made impermeable and incombustible and reinforced by intermediate windings of wire or metal strips, the pipe sections being united by cylindrical joints held in intimate contact with the pipes by metal hoops, and means for regulating or compressing said hoops.

3. In a pipe line of compressed, reinforced and impermeable paste board, a joint for uniting the pipe sections, consisting substantially in a shorter length of pipe made of the same material as the pipe sections or of sheet metal, and of a width substantially equal to the outer diameter of the pipe sections, said joint having longitudinal openings in its extremities, and metal hoops for compressing said extremities and for retaining said joint in intimate contact with the pipe sections.

In testimony whereof I affix my signature in presence of two witnesses.

FERNANDO URBINA.

Witnesses:
D. LAVIN ESCANDON,
COURTLAND E. CHRISTIAN.